(12) United States Patent
Hegde et al.

(10) Patent No.: US 11,555,710 B2
(45) Date of Patent: Jan. 17, 2023

(54) SECURE ECO-ROUTING WITH DATABASES UNDER HOMOMORPHIC ENCRYPTION

(71) Applicant: GM Global Technology Operations LLC, Detroit, MI (US)

(72) Inventors: Bharatkumar Hegde, Bloomfield Hills, MI (US); Chen-Fang Chang, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 47 days.

(21) Appl. No.: 17/231,288

(22) Filed: Apr. 15, 2021

(65) Prior Publication Data

US 2022/0333939 A1 Oct. 20, 2022

(51) Int. Cl.
G01C 21/34 (2006.01)
G01C 21/36 (2006.01)
H04L 9/00 (2022.01)
H04L 9/08 (2006.01)

(52) U.S. Cl.
CPC ..... *G01C 21/3469* (2013.01); *G01C 21/3415* (2013.01); *G01C 21/3605* (2013.01); *G01C 21/3697* (2013.01); *H04L 9/008* (2013.01); *H04L 9/0825* (2013.01)

(58) Field of Classification Search
None
See application file for complete search history.

(56) References Cited

U.S. PATENT DOCUMENTS

| 9,436,835 B1 * | 9/2016 | Saldamli | G06F 21/602 |
| 10,215,576 B2 | 2/2019 | Kang et al. | |
| 10,746,558 B2 | 8/2020 | Muldoon et al. | |
| 2019/0063937 A1 * | 2/2019 | Moore | G01C 21/3697 |

* cited by examiner

*Primary Examiner* — Yuen Wong
*Assistant Examiner* — Hongye Liang
(74) *Attorney, Agent, or Firm* — Vivacqua Crane, PLLC

(57) ABSTRACT

A method for generating energy-optimized travel routes for a motor vehicle includes one or more of the following: receiving an origin destination (OD) of the motor vehicle and an encrypted energy consumption database of the motor vehicle; generating N candidate routes for the OD; evaluating encrypted energy consumption over a route using an encrypted energy consumption database; applying at least one of homomorphic addition function or homomorphic multiplication function to the encrypted energy consumption data; and returning N candidate routes and their encrypted energy consumption to a client.

20 Claims, 4 Drawing Sheets

SECURE ECO-ROUTING WITH DATABASES UNDER HOMOMORPHIC ENCRYPTION

GOVERNMENT FUNDING

This invention was made with government support under contract no. DE-AR0000790 awarded by the U.S. Department of Energy. The government has certain rights in the invention.

INTRODUCTION

The present disclosure relates to determining driving routes for a motor vehicle. More specifically, the present disclosure relates to determining energy-optimized driving routes for a motor vehicle, securely, utilizing homomorphic encryption schemes.

Certain vehicles employ navigation systems to determine a user's present position utilizing global positioning system data. The present position is then displayed via a geocoded and annotated map. The mapping data may include topographical, road network, and point of interest information. Such information is typically communicated to the navigation system from a remote geospatial database or accessed from an onboard memory location.

In various arrangements, a recommended travel route is determined by the navigation system based on the shortest time or distance between a route origin and a route destination for a particular trip. The recommended travel route is then displayed as a map trace and/or as turn-by-turn driving directions. Such conventional approaches to route planning, while effective at determining the shortest distance or travel time, are less than optimal for determining the most energy efficient of available routes or for optimally controlling operation of the vehicle. Further, determining energy efficient routes requires the use of energy consumption models that are typically "confidential" and undesirable to disclose to third parties.

Thus, while current navigation systems achieve their intended purpose, there is a need for a new and improved system and method for determining energy-optimized routes.

SUMMARY

According to several aspects, a method for generating energy-optimized travel routes for a motor vehicle includes one or more of the following: receiving an origin destination (OD) of the motor vehicle and an encrypted energy consumption database of the motor vehicle; generating N candidate routes for the OD; evaluating encrypted energy consumption over a route using an encrypted energy consumption database; applying at least one of homomorphic addition function or homomorphic multiplication function to the encrypted energy consumption data; and returning N candidate routes and their encrypted energy consumption to a client.

In an additional aspect of the present disclosure, the client is the motor vehicle, a mobile device or a desktop computer or any device capable of electronic communication.

In another aspect of the present disclosure, the method further includes receiving the OD pair and the encrypted energy consumption database with a public key or an identifier for the energy consumption database that is stored in a server.

In another aspect of the present disclosure, the method further includes generating dynamic road data for each route of the N candidate routes.

In another aspect of the present disclosure, dynamic road data includes at least one of road grade, traffic density and speed limitations.

In another aspect of the present disclosure, the method further includes querying energy consumption of the motor vehicle from the encrypted energy consumption database.

In another aspect of the present disclosure, the method further includes storing total energy consumption for each route of the N candidate routes.

In another aspect of the present disclosure, the method further includes checking each route of the N candidate routes for other criteria, including at least one of trip time, distance, roadway type traversed, and tolls.

In another aspect of the present disclosure, returning all N routes to the client includes encrypted energy consumption for each route.

According to several aspects, a method for generating energy-optimized travel routes for a motor vehicle includes one or more of the following: receiving N candidate routes from an eco-routing service for an origin-routing destination (OD) with their encrypted energy consumption data and a public key; decrypting the encrypted energy consumption data with a private key; and sending OD and an encrypted energy consumption database to the eco-routing service with a public key.

In another aspect of the present disclosure, the method further includes finding a route with least energy consumption that meets a given set of criteria.

In another aspect of the present disclosure, the method further includes sending information related to the route with the least energy consumption to a client.

In another aspect of the present disclosure, the client is the motor vehicle, a mobile device or a desktop computer or any device capable of electronic communication.

In another aspect of the present disclosure, the method further includes encrypting the energy consumption database with the public key.

According to several aspects, a method for generating energy-optimized travel routes for a motor vehicle includes one or more of the following: sending origin destination (OD) and an encrypted energy consumption database to an eco-routing service with a public key; generating N candidate routes for the OD; determining encrypted energy consumption of the vehicle over a trip using encrypted energy consumption database and homomorphic operations; applying at least one of homomorphic addition or homomorphic multiplication function to the encrypted energy consumption data; and returning all N candidate routes with respective trip times and encrypted energy consumption to a client.

In another aspect of the present disclosure, the client is the motor vehicle, a mobile device or a desktop computer or any device capable of electronic communication.

In another aspect of the present disclosure, the method further includes decrypting the encrypted energy consumption for each route with a private key.

In another aspect of the present disclosure, the method further includes finding a route with least energy consumption.

In another aspect of the present disclosure, the encrypted energy consumption database is in a form of a look-up table, and wherein the energy consumption is encrypted, and independent variables are not encrypted.

In another aspect of the present disclosure, the encrypted energy consumption database is in a form of a polynomial, and wherein coefficients of the polynomial are encrypted and a structure of the polynomial is known.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
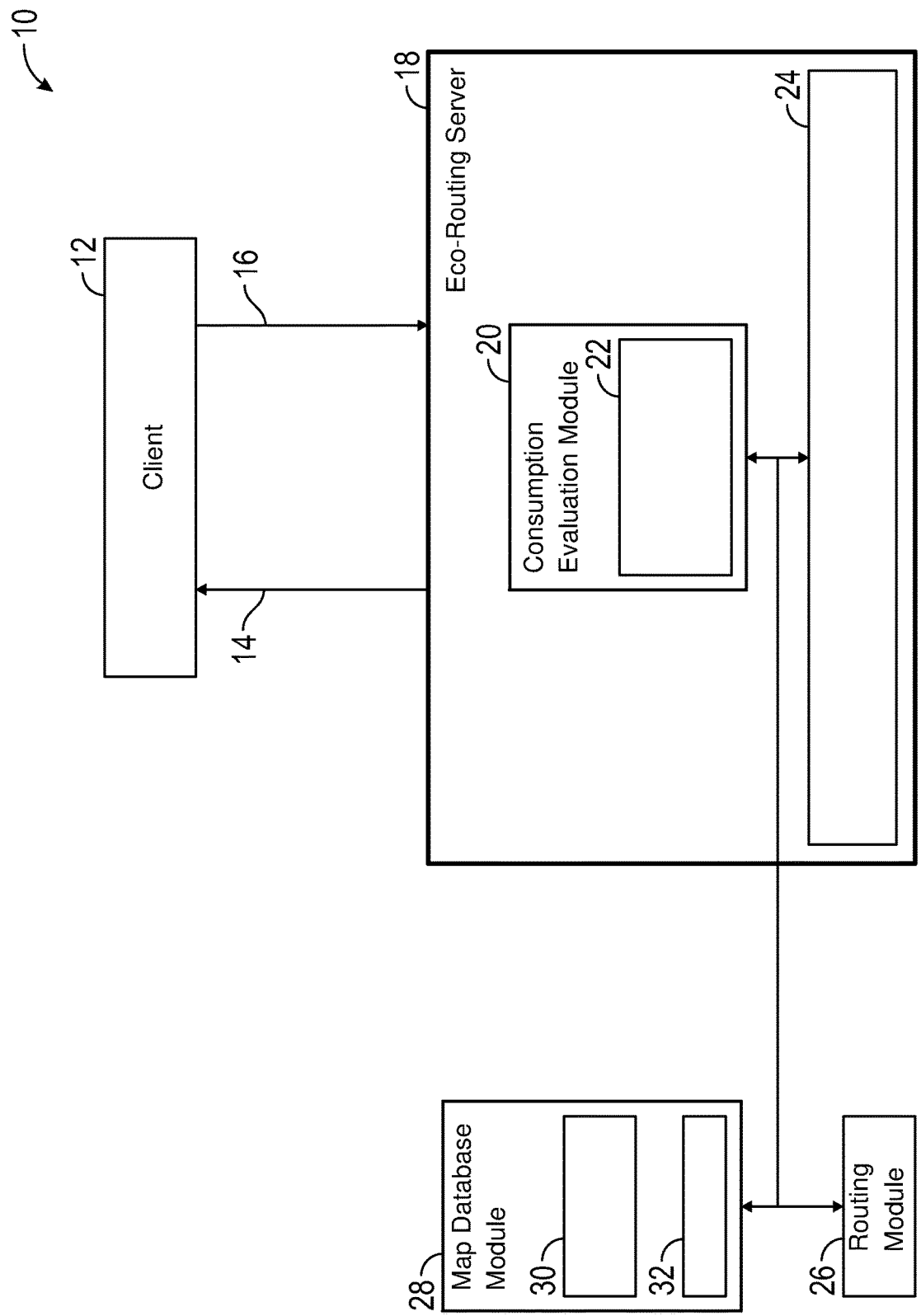
FIG. 1 illustrates a high-level block diagram of a system for routing a vehicle according to an exemplary embodiment.

Referring to FIG. 1, there is shown a block diagram of a system 10 to determine energy-optimized driving routes for a motor vehicle. The system 10 includes an eco-routing service, such as a server 18, that communicates with a client 12 through, for example, a human-machine-interface, such as a visual screen. The client in various arrangements is, but is not limited to, the vehicle itself, a mobile device or a desktop computer. The client 12 and the eco-routing server 18 communicate with each other through secure communication channels 14 and 16, such as, for example, transport security (TLS) channels, which are cryptographic protocols that provide communications security over a network.

When the system 10 is in use, the client 12 sends a request to the eco-routing server 18. The request includes the origin of a trip, a destination of the trip and vehicle and powertrain properties. The eco-routing server 18, in turn, provides a response to the client 12 through the channel 14. The response includes the top-rated N number of fuel-efficient routes and coordinates for the navigation system.

The eco-routing server 18 further communicates with a routing module 26 and a map database 28, which, in various arrangements, includes on-board data 30 stored in the vehicle and online data 32. The communication between the eco-routing server 18 and the map database 28 and the routing module 26 through a secure channel such as TLS.

The eco-routing server 18 further includes a fuel consumption evaluation module 20 and an eco-routing module 24. The fuel consumption evaluation module 20 utilizes the vehicle and powertrain properties sent from the client 12.

Accordingly, for a particular trip, the eco-routing server 18 receives origin-destination (OD) input from the client 12 through, for example, an HMI. The routing module 26 generates candidate routes for the OD pair, and the map database module 28 generates dynamic road data (for example, road grade, traffic density and speed limits) for each candidate route. For each segment of each route, the fuel consumption evaluation module 20 queries energy consumption from the vehicle and powertrain properties. The fuel consumption evaluation module 20 then computes the total energy consumption for each route. The eco-routing module 24 evaluates other criteria, such as, for example, trip time along various points of the trip. Finally, the eco-routing server 18 returns to the client 12 one or more routes with the lowest energy consumption that satisfies all given criteria.

Figure 2:
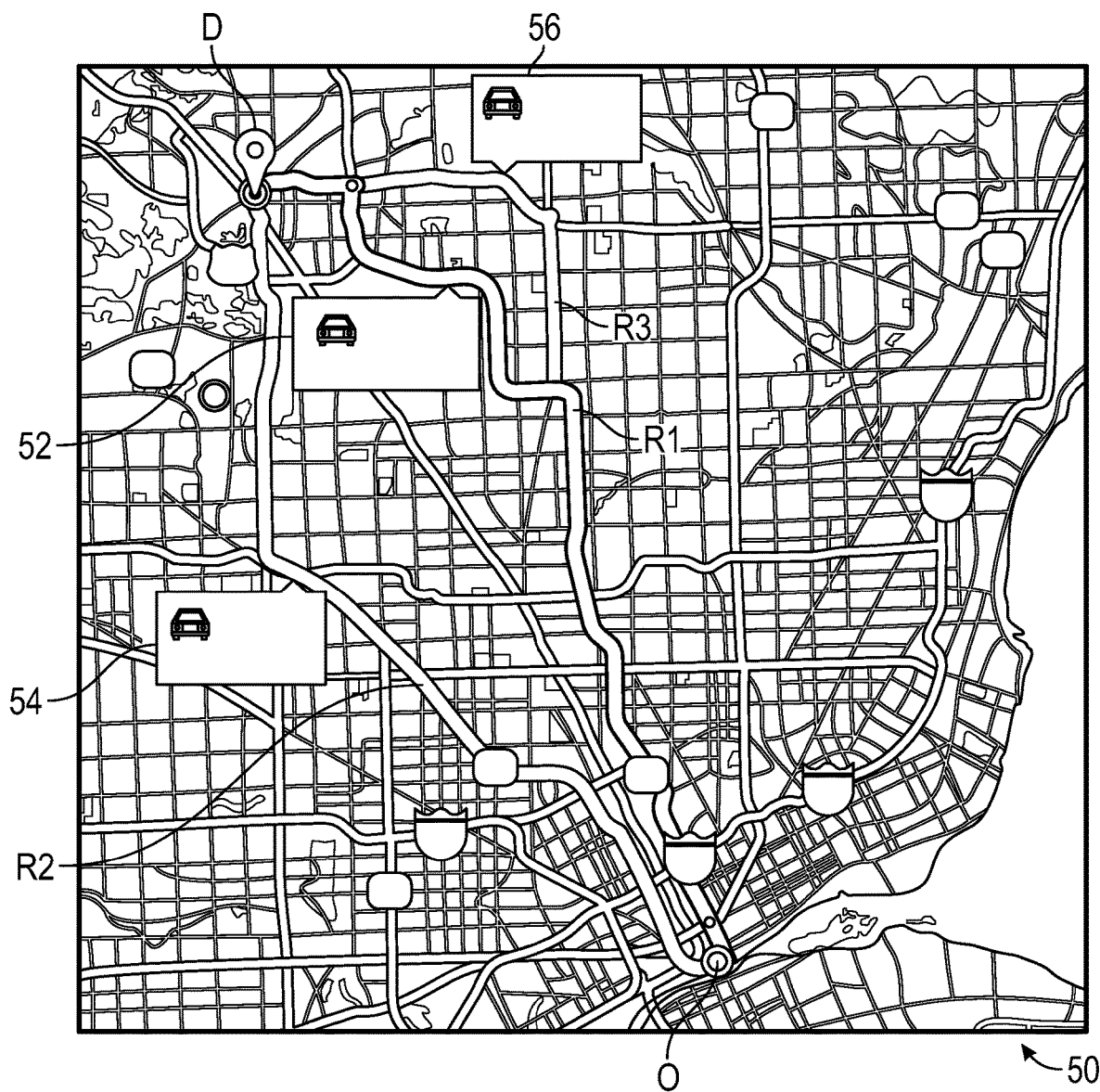
FIG. 2 is a plot of three alternative routes for a motor vehicle.

Shown in FIG. 2 is an example route screen 50 of an HMI that the client 12 interacts with. The example route screen shows different recommended routes R1, R2 and R3. Candidate routes between an origin (0) and a destination (D) are first determined by the system 10 utilizing conventional map planning techniques, such as optimal searching via dynamic programming wherein the optimal route(s) are searched against a given time or distance constraint and costs are associated with traveling each segment of the various possible routes. From the returned routes, the system 10 can then use minimal energy consumption as a further cost constraint, again using local optimization, and thereafter display one or more alternative energy-efficient routes, with routes R2 and R3 being alternatives to route R1.

Further, text bubbles 52, 54 and 56 are displayed, in various arrangements, containing conventional route description data, for example, the estimated time and distance of travel, for instance "37 min" and "28.8 miles" for route R2, "35 min" and "31.5 miles" for R3 and "30 min" and "30.8 miles" for route R1. Additional text bubbles are optionally populated with relative or actual energy consumption information for each of the routes R1, R2 and R3. For instance, while actual values of fuel consumption are utilized in some arrangements, the system 10 may instead display relative values such as 1 for the conventional shortest/fastest route, and a value such as 0.8 for another route to indicate that traveling along that route would reduce energy consumption by about 20% relative to traveling along the shortest/fastest route.

Thus, knowing the vehicle-specific energy consumption and corresponding characteristics of the vehicle, and knowing the constraints along alternative routes R1, R2 and R3 in terms of posted speed limits, traffic, traffic lights, construction, etc., the system 10 estimates energy consumption of the vehicle 10 using demonstrated past behavior when traveling under similar traveling and vehicle state conditions. The operator of the vehicle is thus able to select one of the displayed energy-efficient routes R1, R2 or R3, with the HMI, thereafter, providing turn-by-turn driving instructions for navigating the selected energy-efficient route R1, R2 or R3.

Figure 3:
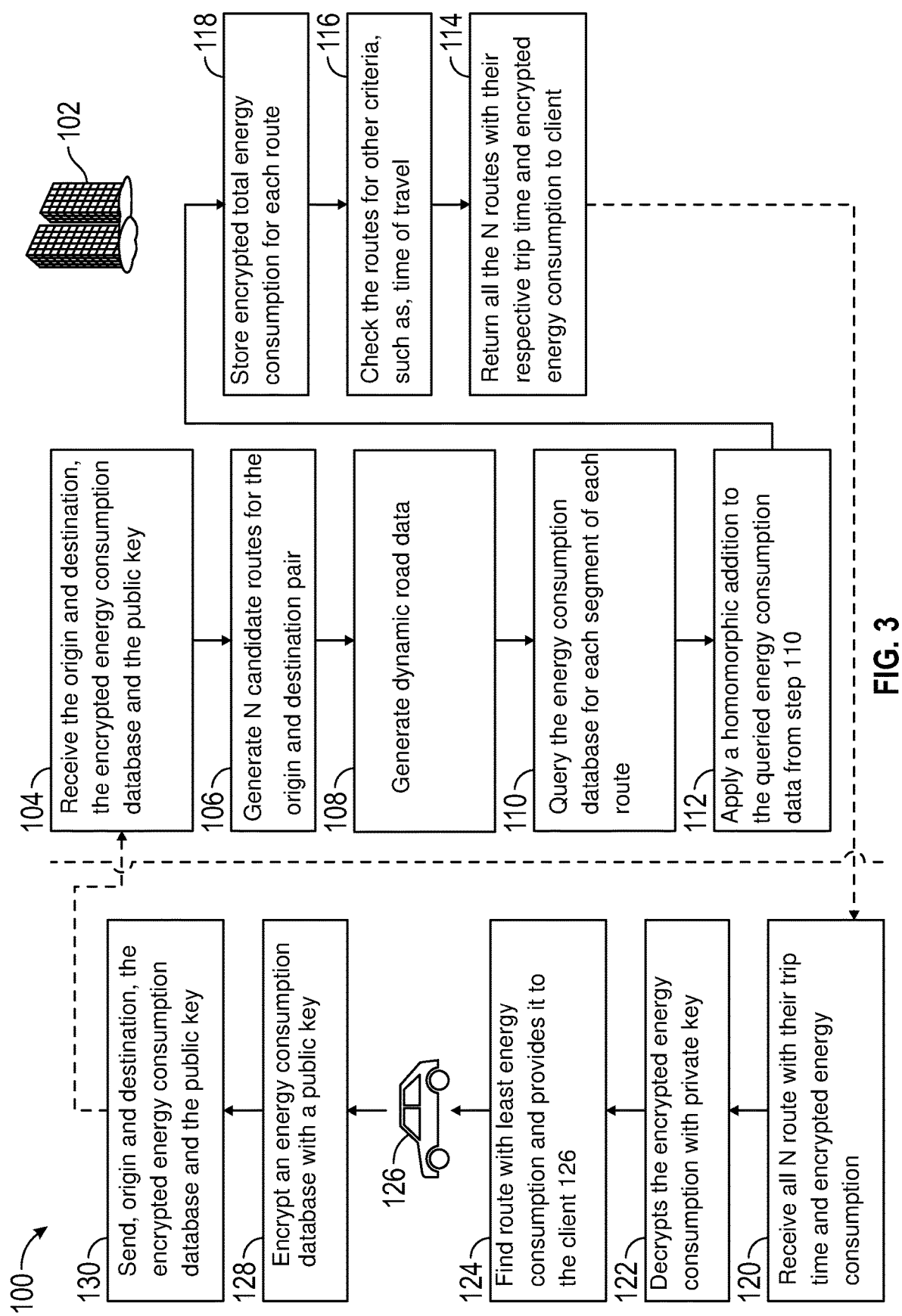
FIG. 3 is a flow diagram of a process illustrating a secure portion of the system shown in FIG. 1.

Turning now to FIG. 3, there is shown a process 100 providing greater detail of the operation of the system 10. In this process, a client 126, such as, the vehicle, a mobile device, a desktop computer, or any other device capable of electronic communication, including by not limited to vehicle/engine controller, and ECUs, communicates with an eco-routing service, such as a server 102. The process 100 between the two components (the client 126 and the eco-routing server 102) is indicated by the left-most dashed vertical line.

In use, step 128 encrypts an energy consumption database with a public key or an identifier for the energy consumption database that is stored in the server 102. The client 126 sends origin and destination information (OD), the encrypted energy consumption database and the public key, as indicated by step 130 to the eco-routing server 102. The eco-routing server 102 receives this information in step 104.

A step 106 generates N candidate routes for the OD pair, where N is a number greater than zero. For each candidate route, step 108 generates dynamic road data based on, for example, road grade, traffic density and speed limits. And for each segment of each route, step 110 queries the energy consumption database. The encrypted energy consumption for each segment is transmitted to step 112, which applies a homomorphic addition function to the queried energy consumption. Alternatively, a homomorphic multiplication function is applied to the queried energy consumption.

Next, step 118 stores encrypted total energy consumption for each route, and step 116 checks the routes for other criteria, such as, for example, trip time along various points of the respective route. Subsequently, step 114 returns all N routes with their respective trip time and encrypted energy consumption to the client side of the process 100.

Accordingly, step 120 receives all N routes with their respective trip time and encrypted energy consumption. Next, step 122 decrypts the encrypted energy consumption with a private key, and step 124 finds the route with the least energy consumption that meets all the provided criteria. This information is then provided to the client 126.

The encryption scheme discussed above utilizes fully or partially homomorphic addition, namely, $f(E(a), E(b))=E(a+b)$ and $D(E(a))+D(E(b))=D(E(a+b))=a+b$, where f is an operation that results in homomorphic addition, E and D are encryption and decryption functions respectively such that $D(E(a))=a$, and a, b are real numbers.

The scheme is asymmetric that employs a public key $(p_b)$ to encrypt and a private key $(p_v)$ to decrypt the data such that $D(E(x, p_b), p_v)=x$.

Encrypted with Paillier encryption scheme:

$$D(E(mm))=mm$$

where mm is the data of interest;

$E(\cdot)$ is the encryption operation with a public key $(\bar{p}_b)$ according to Paillier encryption scheme; and $D(\cdot)$ is the decryption operation with a private key $(\bar{p}_v)$ according to Paillier encryption scheme.

Let $f_i(x_i, y_i)$ be the energy consumption at $x=x_i$ and $y=y_i$, $i=1, 2, 3, 4 \ldots N$ Then, $f(x, y)$ is the interpolated energy consumption at x, y Then, $E(f(x, y))$ is the interpolated encrypted energy consumption given x, y.

In this method, at the server 102, $f(x, y)$ is encrypted and (x, y) are not encrypted.

To find $E(f(x, y))$ for $f(x, y)$ represented as a look-up table, given x, y:

The process 100 finds $$Ef_{aa}=E(f(x_a,y_a)), Ef_{ab}=E(f(x_a,y_b)),$$

$$Ef_{ba}=E(f(x_b,y_a)), Ef_{bb}=E(f(x_b,y_b)),$$

where $x_a \leq x \leq x_b$ and $y_a \leq y \leq y_b$. And $x_a$, $x_b$, $y_a$, $y_b$ are grid points on the look-up table such that interpolation is not necessary to determine the values of either $E(f(x_a, y_a))$, $E(f(x_b, y_a))$, $E(f(x_a, y_b))$, $E(f(x_b, y_b))$.

The process 100 computes:

$$C_{aa} = \left(\frac{(x_b - x)(y_b - y)}{(x_b - x_a)(y_b - y_a)}\right);$$

$$C_{ba} = \left(\frac{(x - x_a)(y_b - y)}{(x_b - x_a)(y_b - y_a)}\right);$$

$$C_{ab} = \left(\frac{(x_b - x)(y - y_a)}{(x_b - x_a)(y_b - y_a)}\right) + C_{bb} = \left(\frac{(x - x_a)(y - y_a)}{(x_b - x_a)(y_b - y_a)}\right)$$

Note that $C_{aa}$, $C_{ab}$, $C_{ba}$, $C_{bb}$ are plaintexts (not encrypted) while $Ef_{aa}$ etc. are encrypted.

Utilizing the properties of the Paillier homomorphic encryption scheme, the encryption module is determined:

$$E(f(x,y))=(Ef_{aa})C^{aa},(Ef_{ab})C^{ab},(Ef_{ba})C^{ba},(Ef_{bb})C^{bb},$$

with appropriate modulo operations.

Figure 4:
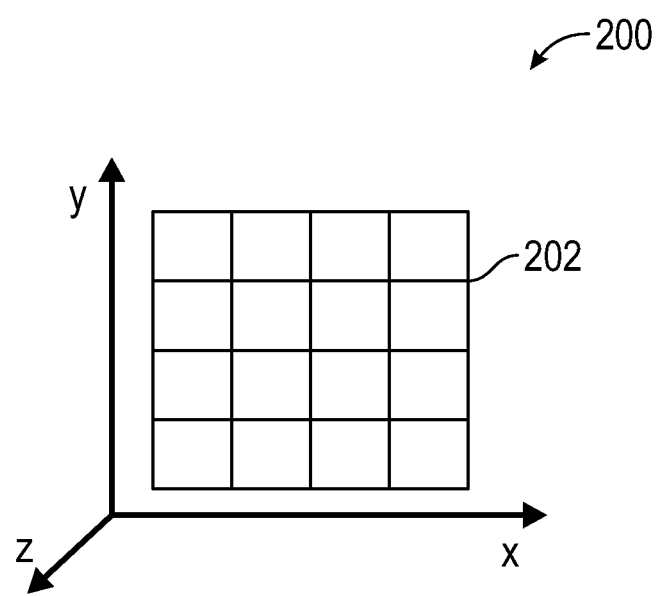
FIG. 4 is an example look-up table for the process shown in FIG. 3.

As an example, the scheme is applied to the lookup table shown in FIG. 4, x represents the average traffic flow speed, y represents the road grade and z represents the road curvature. As such, the energy/fuel consumption 202 is a function of x, y, z, namely, g(x, y, z). Although FIG. 4 shows the energy consumption as a function of three variables, the energy can be a function of any number of variables, that is, g(x, y, z, . . . ). Further note that the variables x, y and z are not encrypted, while the energy/fuel consumption 202 is encrypted.

Applying to the generalized encryption scheme discussed above to the table in FIG. 4, polynomial coefficients are encrypted, and the structure of the polynomial is known publicly, so that the identifier for each polynomial coefficient set is not encrypted. Hence, for example $E(\text{energy consumption}) \leftarrow a1 \cdot x + a2 \cdot x^2 + a3 \cdot y + a4 \cdot z \cdot y + \ldots$, E, a1, a2, a3, a4 . . . are encrypted, and x, y, and z are not encrypted.

Encrypting with the Paillier encryption scheme:

$$D(E(mm))=mm;$$

where mm is the data of interest;

$E(\cdot)$ is the encryption operation with a public key $(\bar{p}_b)$ according to Paillier encryption scheme; and $D(\cdot)$ is the decryption operation with a private key $(\bar{p}_v)$ according to Paillier encryption scheme.

Let $f(x, y, z))=a_1x+a_2x^2+a_3y+a_4y^2+a_5y^2z$ be the energy consumption at x, y, z, then, $E(f(x, y, z)$ is the interpolated encrypted energy consumption given x, y, z In this method, at the server 102, the coefficients $a_1$, $a_2 \ldots a_5$ are encrypted and (x, y, z) are not encrypted.

To find $E(f(x, y, z)$ given x, y, z:

Using the properties of Paillier homomorphic encryption scheme:

$$E(f(x,y))=a_1^x \cdot a_2^{x^2} \cdot a_3^y \cdot a_4^{y^2} \cdot a_5^{y^2z}$$

with appropriate modulo operations.

A system and method 10,100 for determining energy-optimized routes of the present disclosure offer several advantages. These include determining energy optimized routes while keeping the confidential energy consumption model secret using encryption schemes and a unique methodology that enables computation of encrypted energy consumption over a route. Further, the system and method enable a third party to host the system and method, for ride sharing vehicle routing, autonomous taxi service and add-on eco-routing service to current customers. Moreover, the system and method 10,100 provide eco-routing service to other customers as well, for example, various OEMs, and as a bridge between ride-sharing companies and OEMs.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for generating energy-optimized travel routes for a motor vehicle, the method comprising:
receiving an origin and destination (OD) of the motor vehicle sent from a device of a client, and an encrypted energy consumption database of the motor vehicle from an eco-routing service through a secure communication channel, the eco-routing service comprising a fuel consumption evaluation module and an eco-routing module;

generating N candidate routes for the OD;

evaluating encrypted energy consumption over a route using the encrypted energy consumption database;

applying at least one of homomorphic addition function, of the form $f(E(a), E(b))=E(a+b)$ and
$D(E(a))+D(E(b))=D(E(a+b))=a+b$, where a, b are messages to be encrypted and decrypted, E is an encrypting function, D is a decrypting function, and f is an operation that results in homomorphic addition to encrypted energy consumption data;

or homomorphic multiplication function, of the form $g(E(a), E(b))=E(a*b)$ and
$D(E(a))*D(E(b))=D(E(a*b))=a*b$, where a, b are messages to be encrypted and decrypted, E is the encrypting function, D is the decrypting function, and g is an operation that results in homomorphic multiplication to the encrypted energy consumption data; and returning the N candidate routes and their encrypted energy consumption to a client.

2. The method of claim 1, wherein the client is the motor vehicle, a mobile device or a desktop computer or any device capable of electronic communication.

3. The method of claim 1 further comprising receiving the OD and the encrypted energy consumption database with a public key or an identifier for the encrypted energy consumption database that is stored in a server.

4. The method of claim 1 further comprising generating dynamic road data for each route of the N candidate routes.

5. The method of claim 4, wherein the dynamic road data includes at least one of road grade, traffic density and speed limitations.

6. The method of claim 1 further comprising querying energy consumption of the motor vehicle from the encrypted energy consumption database.

7. The method of claim 1 further comprising storing total energy consumption for each route of the N candidate routes.

8. The method of claim 1 further comprising checking each route of the N candidate routes for other criteria, including at least one of trip time, distance, roadway type traversed, and tolls.

9. The method of claim 8, wherein returning the N candidate routes to the client includes encrypted energy consumption for each route.

10. A method for generating energy-optimized travel routes for a motor vehicle, the method comprising:

encrypting an energy consumption database with a public key;

sending an origin and destination (OD), the encrypted energy consumption database and the public key to an eco-routing service comprising of a fuel consumption evaluation module and an eco-routing module;

applying at least one of homomorphic addition function, of the form $f(E(a), E(b))=E(a+b)$ and
$D(E(a))+D(E(b))=D(E(a+b))=a+b$, where a, b are messages to be encrypted and decrypted, E is an encrypting function, D is a decrypting function, and f is an operation that results in homomorphic addition to encrypted energy consumption data;

or homomorphic multiplication function, of the form $g(E(a), E(b))=E(a*b)$ and
$D(E(a))*D(E(b))=D(E(a*b))=a*b$, where a, b are messages to be encrypted and decrypted, E is the encrypting function, D is the decrypting function, and g is an operation that results in homomorphic multiplication to the encrypted energy consumption data;

receiving N candidate routes from the eco-routing service for an origin and destination (OD) pair with encrypted energy consumption data of each of the N candidate routes and the public key;

decrypting the encrypted energy consumption data with a private key; and filtering the received N candidate routes by comparing decrypted energy consumption data to determine a route with least energy consumption.

11. The method of claim 10 further comprising finding a route with least energy consumption that meets a given set of criteria.

12. The method of claim 11 further comprising sending information related to the route with least energy consumption to a client.

13. The method of claim 12, wherein the client is the motor vehicle, a mobile device or a desktop computer or any device capable of electronic communication.

14. The method of claim 13 further comprising encrypting the encrypted energy consumption database with the public key.

15. A method for generating energy-optimized travel routes for a motor vehicle, the method comprising:

sending origin and destination (OD) from a device of a client and an encrypted energy consumption database of the motor vehicle to an eco-routing service with a public key through a secure communication channel, the eco-routing service comprising a fuel consumption evaluation module and an eco-routing module;

generating N candidate routes for the OD;

determining encrypted energy consumption of the vehicle over a trip using the encrypted energy consumption database and homomorphic operations;

applying at least one of homomorphic addition function, of the form $f(E(a), E(b))=E(a+b)$ and
$D(E(a))+D(E(b))=D(E(a+b))=a+b$, where a, b are messages to be encrypted and decrypted, E is an encrypting function, D is a decrypting function, and f is an operation that results in homomorphic addition to encrypted energy consumption data;

or homomorphic multiplication function, of the form $g(E(a), E(b))=E(a*b)$ and
$D(E(a))*D(E(b))=D(E(a*b))=a*b$, where a, b are messages to be encrypted and decrypted, E is the encrypting function, D is the decrypting function, and g is an operation that results in homomorphic multiplication to the encrypted energy consumption data; and returning the N candidate routes with respective trip times and encrypted energy consumption to a client.

16. The method of claim 15, wherein the client is the motor vehicle, a mobile device or a desktop computer or any device capable of electronic communication.

17. The method of claim 15, further comprising decrypting the encrypted energy consumption for each route with a private key.

18. The method of claim 17, further comprising finding a route least energy consumption.

19. The method of claim 15, wherein the encrypted energy consumption database is in a form of a look-up table, and wherein the energy consumption is encrypted, and independent variables are not encrypted.

20. The method of claim 15, wherein the encrypted energy consumption database is in a form of a polynomial, and wherein coefficients of the polynomial are encrypted, and a structure of the polynomial is known.

* * * * *